United States Patent [19]

Sarangdhar et al.

[11] Patent Number: 5,682,516
[45] Date of Patent: Oct. 28, 1997

[54] COMPUTER SYSTEM THAT MAINTAINS SYSTEM WIDE CACHE COHERENCY DURING DEFERRED COMMUNICATION TRANSACTIONS

[75] Inventors: Nitin V. Sarangdhar, Beaverton; Wen Han Wang, Portland; Michael W. Rhodehamel; James M. Brayton, both of Beaverton; Amit Merchant, Portland; Matthew A. Fisch, Beaverton, all of Oreg.

[73] Assignee: Intel Corporation, Santa Clara, Calif.

[21] Appl. No.: 205,023

[22] Filed: Mar. 1, 1994

[51] Int. Cl.[6] ................................................. G06F 13/18
[52] U.S. Cl. ...................... 395/473; 395/731; 395/856; 395/879; 395/732
[58] Field of Search ........................... 395/444–451, 395/473, 800, 731, 732, 856, 879; 364/DIG. 1, DIG. 2

[56] References Cited

U.S. PATENT DOCUMENTS

| | | | |
|---|---|---|---|
| 4,755,930 | 7/1988 | Wilson, Jr. et al. | 395/449 |
| 5,191,649 | 3/1993 | Cadambi et al. | 395/200.05 |
| 5,265,235 | 11/1993 | Sindha et al. | 395/447 |
| 5,426,765 | 6/1995 | Stevens et al. | 395/458 |

FOREIGN PATENT DOCUMENTS 2268859A  7/1992  United Kingdom.

OTHER PUBLICATIONS

V. Popescu, et al., "The Metaflow Architecture", IEEE Micro, 1991, pp.10–13, and 63–73.
William W. Collier, "Reasoning About Parallel Architectures", entire book, Prentice Hall, 1992.

Primary Examiner—Tod R. Swann
Assistant Examiner—James Peikari
Attorney, Agent, or Firm—Blakely, Sokoloff, Taylor & Zafman

[57] ABSTRACT

A computer system is disclosed having a requesting bus agent that issues a communication transaction over a bus and an addressed bus agent that defers the communication transaction to avoid high bus latency. The addressed bus agent later issues a deferred reply transaction over the bus to complete the communication transaction. Special snoop ownership and cache state transition rules maintain cache coherency and processor consistency during deferred communication transactions.

38 Claims, 14 Drawing Sheets

FIG_2

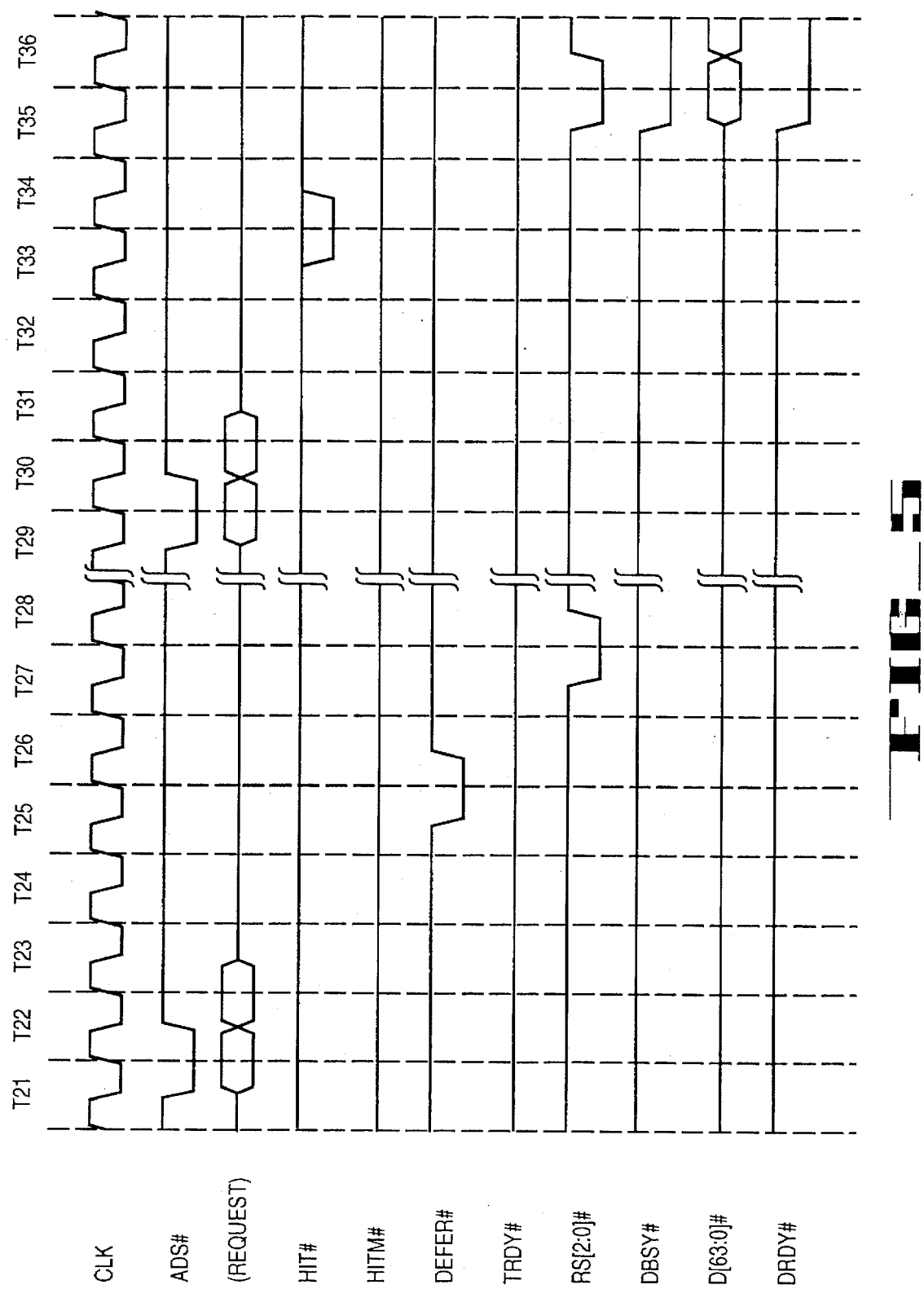
FIG_5

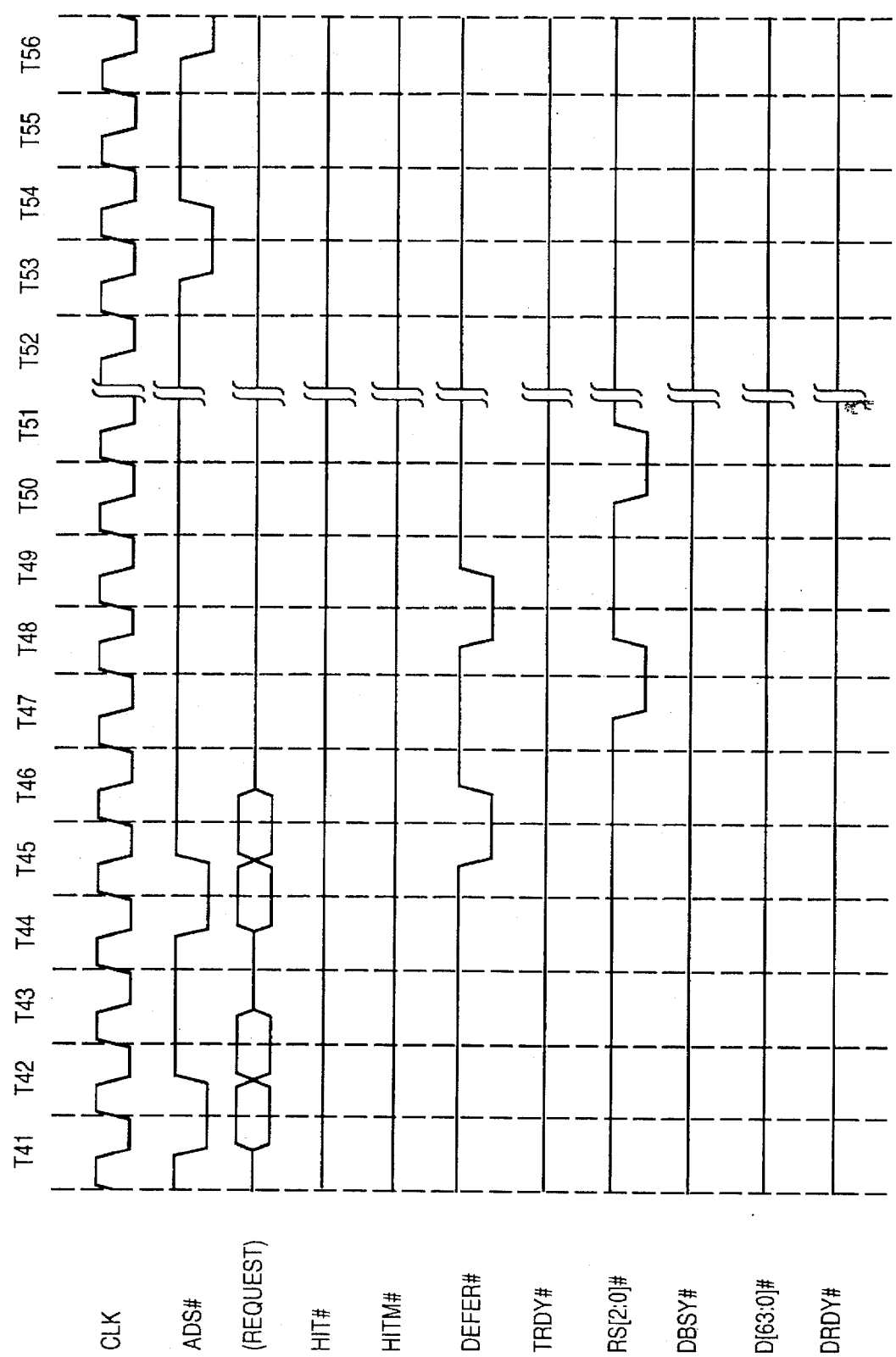
FIG_6

| Transaction | Initial Cache State | Snoop Response | Final Cache State | Comments |
|---|---|---|---|---|
| Read Line | Invalid | DEFER and not HITM | Invalid | Snoop ownership is deferred |
| Deferred Reply | Invalid | not DEFER and HIT | Shared | |
| Deferred Reply | Invalid | not DEFER and HITM | Shared | |
| Deferred Reply | Invalid | not DEFER and not HIT and not HITM | Exclusive | |
| Deferred Reply | Invalid | DEFER and not HITM | Invalid | Transaction requires retry |

*Figure 10*

| Transaction | Initial Cache State | Snoop Response | Final Cache State | Comments |
|---|---|---|---|---|
| Invalidate Line | Shared | DEFER and not HITM | Shared | Snoop ownership is deferred |
| Deferred Reply | Shared | not DEFER and not HITM | Modified | |
| Deferred Reply | Shared | DEFER and not HITM | Shared | Transaction requires retry |
| Back Invalidation | Shared | not DEFER and not HITM | Invalid | |
| Deferred Reply | Invalid | not DEFER and HITM | Modified | Data Returned |
| Deferred Reply | Invalid | DEFER and not HITM | Invalid | Re initiate as a read for ownership |

*Figure 11*

| Transaction | Initial Cache State | Snoop Response | Final Cache State | Comments |
|---|---|---|---|---|
| Read for ownership | Invalid | DEFER and not HITM | Invalid | Snoop ownership is deferred |
| Deferred Reply | Invalid | DEFER and not HITM | Invalid | Re initiate read for ownership |
| Deferred Reply | Invalid | not DEFER and not HIT | Modified | |
| Deferred Reply | Invalid | not DEFER and not HITM | Modified | |
| Deferred Reply | Invalid | HITM | Modified | |

*Figure 12*

| Transaction | Initial Cache State | Snoop Response | Final Cache State | Comments |
|---|---|---|---|---|
| Write through | Shared | DEFER and not HITM | Shared | Transaction is deferred |
| Back Invalidation | Shared | Ignore | Invalid | |
| Deferred Reply | Shared | DEFER and not HITM | Shared | Transaction requires retry |
| Deferred Reply | Shared | not DEFER and not HIT | Exclusive | |
| Deferred Reply | Shared or Invalid | HITM | Exclusive | New cache line from deferred reply |

*Figure 13*

COMPUTER SYSTEM THAT MAINTAINS SYSTEM WIDE CACHE COHERENCY DURING DEFERRED COMMUNICATION TRANSACTIONS

BACKGROUND OF THE INVENTION

1. Field of the Invention

The present invention pertains to the field of computer systems. More particularly, this invention relates to maintaining cache coherency and processor consistency in a computer system during communication transactions.

2. Background

A typical prior multiprocessor computer system implements a set of processors coupled for communication over a bus. Such a multiprocessor computer system typically includes one or more input/output subsystems and memory subsystems coupled to the bus. Each processor, each input/output subsystem, and each memory subsystem coupled to the bus usually functions as a bus agent on the bus. The bus agents coupled to a bus may be referred to as a bus cluster.

A bus cluster may be coupled to one or more other bus clusters through system interconnect buses or communication networks. Typically, node interface subsystems coupled as bus agents to the buses enable communication between the bus clusters.

The processors in each bus cluster of such a system commonly contain internal data caches that reflect the data storage provided by the memory subsystems in the bus clusters. Such processors typically maintain internal cache data according to a set of predefined cache data states. Such cache data states typically indicate whether an internal cache line is valid, modified, or shared with other bus agents in the system.

Typically, each bus agent having an internal cache implements a cache controller that monitors the bus for communication transactions that affect the cache state of internal cache data. Such monitoring is typically referred to as "snooping" the bus. The bus agents that snoop the bus use the snoop results to update the internal cache data states. Bus agents that broadcast snoop status for a cache line over the bus are said to have "snoop ownership" of the cache line.

The predefined cache states enable processor consistency throughout the system by informing each processor having an internal data cache whether access to an internal cache line requires coordination with other bus agents in the system. For example, a processor seeking to write to an internal cache line that has a shared cache state typically issues a read for ownership or invalidate transaction to the other bus agents before internally writing to the cache line. The read for ownership or invalidate transaction provides updated the cache line data for the issuing bus agent, invalidates the cache state for the cache line in the other bus agents, and causes the other bus agents to pass snoop ownership for the cache line.

In addition, some communication transactions in such a system are subject to relatively high bus latency. For example, a communication transaction issued by a bus agent in a bus cluster that requires access to another bus cluster typically has a relatively high bus latency. Typically, the relatively high bus latency occurs while the node interface bus agents buffer and propagate the communication transaction between the appropriate bus clusters.

Such high latency bus transactions hinder communication in the system because other communication transactions are typically delayed until the high latency transaction completes. The subsequent communication transactions are usually delayed because the snoop results from the high latency bus transactions may be required for maintaining processor consistency during subsequent communication transactions. For example, the snoop ownership for a cache line or the cache state for a cache line may change during the high bus latency transaction. Unfortunately, the delays caused by high bus latency communication transactions reduces overall system communication throughput.

SUMMARY AND OBJECTS OF THE INVENTION

One object of the present invention is to provide a system that prevents high latency bus transactions from slowing communication throughput.

Another object of the present invention is to prevent high latency bus transactions from slowing communication by deferring completion of the high bus latency communication transactions while maintaining system wide cache coherency.

Another object of the present invention is to maintain system wide cache coherency during deferred communication transactions in a system having multiple bus clusters.

Another object of the present invention is to maintain processor consistency during deferred communication transactions in a system having multiple processors and multiple bus clusters.

A further object of the present invention is to implement bus agents that observe a set of cache state transition rules for maintaining system wide cache coherency during deferred communication transactions.

Another object of the present invention is to implement bus agents that pass snoop ownership during deferred transactions according to a set of snoop ownership rules for maintaining system wide cache coherency and processor consistency.

These and other objects of the invention are provided by a computer system comprising a requesting bus agent and an addressed bus agent coupled to a bus. The requesting bus agent issues a communication transaction over the bus. The addressed bus agent senses the communication transaction and defers the communication transaction if the communication transaction requires a bus latency greater than a predetermined bus latency. The deferred transaction is later completed out of order during a deferred reply transaction on the bus. Another bus agent coupled to the bus may override the defer of the communication transaction and complete the communication transaction in-order.

The passing of snoop ownership for a cache line specified by the deferred communication transaction is delayed until completion of the deferred communication transaction. The internal cache state transition for the requesting bus agent is also delayed until completion of the deferred communication transaction. The requesting bus agent and the addressed bus agent observe special cache state transition rules between the deferred transaction and the deferred reply transaction that completes the deferred transaction.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 5 illustrates a read transaction on a bus that receives a deferred response, and shows a corresponding deferred reply transaction;

FIG. 6 illustrates a snoop ownership pickup by a memory subsystem after indicating a deferred response to an invalidate line request from a processor;

FIG. 10 summarizes the cache state transitions for a requesting bus agent that issues a read transaction;

FIG. 11 summarizes the cache state transitions for a requesting bus agent that issues an invalidate transaction to invalidate a cache line;

FIG. 12 summarizes the cache state transitions for a requesting bus agent that issues a read for ownership transaction;

FIG. 13 summarizes the cache state transitions for a requesting bus agent that issues a write through transaction.

DETAILED DESCRIPTION

Figure 1:
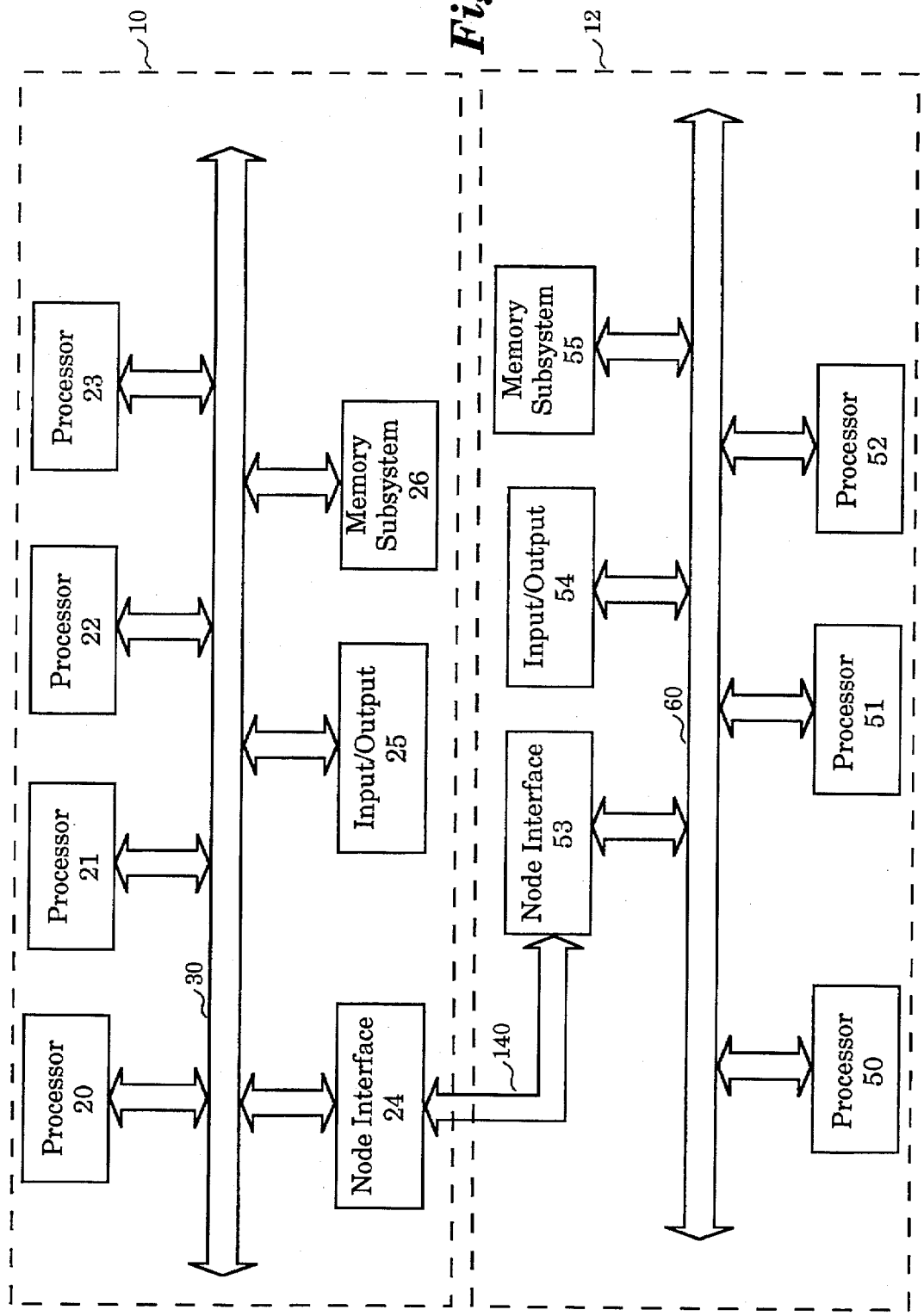
FIG. 1 illustrates a computer system comprising a pair of bus clusters.

FIG. 1 illustrates a computer system comprising a bus cluster 10 and a bus cluster 12. For one embodiment, the bus clusters 10 and 12 communicate over a system interconnect bus 140. For another embodiment, communication between the bus clusters 10 and 12 is enabled by a local area network (not shown).

The bus cluster 10 comprises a set of processors 20–23, a node interface circuit 24, an input/output circuit 25, and a memory subsystem 26. The processors 20–23, the node interface circuit 24, the input/output circuit 25, and the memory subsystem 26 are coupled to function as bus agents on a bus 30. Although two clusters 10 and 12, and four processors 20–23 are shown for illustrative purposes, other numbers may be used according to the system of the present invention.

The bus cluster 12 comprises a set of processors 50–59, a node interface circuit 53, an input/output circuit 54, and a memory subsystem 55. The processors 50–52, the node interface circuit 53, the input/output circuit 54, and the memory subsystem 55 function as bus agents on a bus 60.

The node interface circuits 24 and 53 are bus cluster interconnect or bridge circuits that enable communication between the bus clusters 10 and 12 over the system interconnect bus 140. The node interface circuit 24 is a bus agent on the bus 30. The node interface circuit 24 responds to communication transactions on the bus 30 targeted for a bus agent coupled to the bus 60. The node interface circuit 24 then causes the node interface circuit 53 to generate a corresponding communication transaction over the bus 60 to access the targeted bus agent.

The node interface circuits 24 and 23 implement internal transaction queues for buffering transaction information and for propagating communication transactions between the buses 30 and 60.

Figure 2:
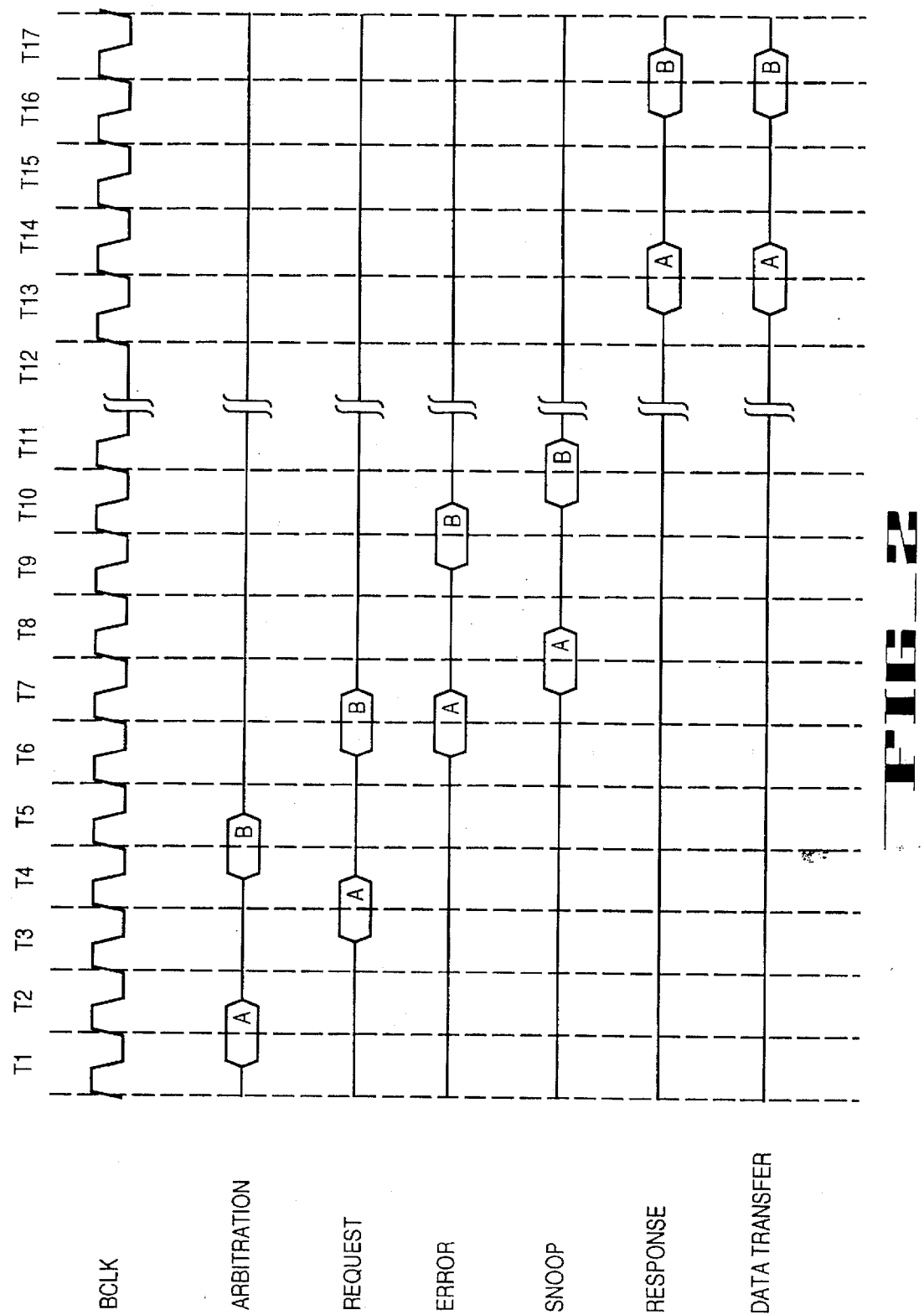
FIG. 2 is a timing diagram that illustrates a pair of communication transactions over a bus and illustrates a set of bus phases.

FIG. 2 is a timing diagram that illustrates a pair of communication transactions A and B over the bus 30. A communication transaction over the bus 30 comprises a set of bus phases. For one embodiment, the bus phases of the bus 30 comprise an arbitration phase, a request phase, an error phase, a snoop phase, a response phase, and a data phase.

Each bus phase of the bus 30 employs a predetermined set of signals that communicate information for that bus phase. Certain communication transactions over the bus 30 employ a subset of the bus phases. The data transfer bus phase and the response phases may overlap other bus phases.

A bus agent that controls the bus 30 and initiates a communication transaction is said to own the bus 30. A bus agent that initiates a communication transaction over the bus 30 is referred to as the requesting bus agent for that transaction. A bus agent that is addressed during the request phase of a communication transaction over the bus 30 is referred to as the addressed bus agent or the response bus agent for that transaction.

A bus agent must own the bus 30 before initiating a communication transaction. A communication transaction begins with an arbitration phase wherein a bus agent seeking to request the communication transaction seeks ownership the bus 30. During the arbitration phase, the requesting bus agent becomes the bus 30 owner. The arbitration phase for the communication transaction A begins during time T1, and the arbitration phase for the communication transaction B begins during time T4.

After a bus agent acquires ownership of the bus 30, the communication transaction enters the request phase. The request phase for the communication transaction A begins during time T3, and the request phase for the communication transaction B begins during time T6. During the request phase, the owner of the bus 30 as the requesting bus agent transfers a communication request and address information onto the bus 30. For one embodiment, the request phase on the bus 30 comprises two periods of the bus 30 clock (BCLK).

During the first period of the request phase, the requesting bus agent asserts an address strobe (ADS) signal (not shown) onto the bus 30, and transfers a request address and other request information onto the bus 30. The request address and request information enables the bus agents coupled to the bus 30 to perform snooping operations and memory access operations. During the second period of the request phase, the requesting bus agent asserts the appropriate byte enable signals, and transfers a deferred identifier, along with other transaction information onto the bus 30. The deferred identifier is used by the appropriate response bus agent when it is necessary to defer the response to the communication transaction.

The request phase is followed by the error phase of a communication transaction. The error phase for the communication transaction A begins during time T6, and the error phase for the communication transaction B begins during time T9. During the error phase, the bus agents coupled to the bus 30 signal errors such as parity errors that are triggered by the communication request issued during the request phase.

The snoop phase follows the error phase if the communication transaction is not canceled by an error indication during the error phase. The snoop phase for the communication transaction A begins during time T7, and the snoop phase for the communication transaction B begins during time T10.

During the snoop phase of a communication transaction, the bus agents coupled to the bus 30 indicate snoop results that correspond to the request address transferred during the request phase of the communication transaction. The snoop results indicate whether the corresponding request address references a valid or modified (dirty) cache line in an internal cache of a bus agent coupled to the bus 30. The snoop results also indicate whether the transaction will complete in-order and whether the transaction may be deferred for possible out-of-order completion.

The response phase follows the snoop phase if the communication transaction is not canceled by an error indication during the error phase. The response phase for the communication transaction A begins during time T13, and the response phase for the communication transaction B begins during time T16.

During the response phase, the response bus agent for the communication transaction indicates whether the communication transaction has succeeded, deferred, retried or failed. During the response phase, the response bus agent also indicates whether the communication transaction contains a data phase. For one embodiment, the valid indications by the response agent during the response phase include a normal data indication, an implicit writeback indication, a no data indication, a hard failure indication, a deferred transaction indication, and a retry indication.

The communication transaction is complete after the response phase if the communication transaction does not have a data phase. Otherwise, the data phase coincides with the response phase and may extend beyond the response phase. The data phase for the communication transaction A begins during time T13, and the data phase for the communication transaction B begins during time T16.

For example, the data phase occurs for the requesting bus agent to transfer write data over the bus 30 during a write transaction. The data phase also occurs for the requesting bus agent to receive read data from the response bus agent during a read transaction.

A communication transaction may not include all of the bus phases enumerated above, and the bus phases may not occur in the order given above. For example, the response phase overlaps the beginning of the data phase during read transactions. The response phase triggers the data phase for write transactions. The communication transactions that are not canceled during the error phase have the request, error, snoop, and response phases. The data phase occurs only if the communication transaction requires data transfer. The occurrence of the data phase may be indicated by a bus agent during the request phase, the response phase, or the snoop phase.

The arbitration for ownership of the bus 30 may be explicit arbitration during the arbitration phase or implicit arbitration. The arbitration phase occurs only if a bus agent requiring ownership of the bus 30 for the next communication transaction does not already have ownership.

The bus 30 architecture enables pipelined communication transactions wherein the differing bus phases of the pipelined transactions overlap. For one embodiment, the bus 30 is configured to support up to eight outstanding communication transactions simultaneously. In one mode, each processor 20-23 can issue up to four outstanding communication transactions on the bus 30. The pipelined communication transactions receive responses and data over the bus 30 in the same order as the communication transactions are initiated on the bus 30.

Each bus agent coupled to the bus 30 maintains internally a set of bus transaction queues that maintain transaction information in order to track the communication transactions. The transaction information includes the number of transactions outstanding, an identifier for the next transaction to be snooped, an identifier for the next transaction to receive a response, and a flag indicating the transactions issued by that bus agent.

Each bus agent coupled to the bus 30 logs the bus transaction information for all transactions in an internal queue referred to as the in-order queue (IOQ).

All bus agents coupled to the bus 30 maintain identical in-order queue status for tracking the communication transactions issued on the bus 30. Each communication transaction including deferred transactions issued on the bus 30 is entered into the in-order queue of each bus agent coupled to the bus 30. For each bus agent, the communication transaction at the top of the in-order queue is the next transaction to enter the response and data phases.

A requesting bus agent that initiates a communication transaction indicates whether that communication transaction is allowed to be deferred by issuing a defer enable (DEN#) signal during the request phase of the communication transaction. A deferred response to the communication transaction is disabled if the defer enable signal is inactive during the request phase of the transaction. The bus agent having a low tolerance for transaction latency may issue communication transactions with the defer enable signal inactive to ensure transaction completion within a restricted latency requirement.

During the snoop phase of a communication transaction, the bus agents coupled to the bus 30 indicate whether the communication transaction will be completed in-order or whether the transaction will be deferred and completed out-of-order. A response bus agent indicates that the communication transaction will be deferred by issuing a defer (DEFER#) signal during the snoop phase of the communication transaction.

In parallel, a snooping bus agent indicates that the communication transaction will be completed in-order by issuing a modified hit (the active low HITM#, hereinafter HITM) signal during the snoop phase of the communication transaction. A snooping bus agent issues the HITM signal during the snoop phase if the bus agent holds the data specified by the request address of the communication transaction in an internal data cache in a modified cache state.

The in-order completion of a communication transaction on the bus 30 is indicated by an inactive DEFER signal or an active HITM signal during the snoop phase of the communication transaction, followed by a normal completion or an implicit writeback indication during the response phase of the transaction. A snooping bus agent holding the data in modified cache state is able to complete the communication transaction in-order even though the addressed bus agent may issue the DEFER signal during the snoop phase. As a consequence, the modified hit indication overrides the DEFER signal during the snoop phase, thereby yielding an in-order completion of the communication transaction.

Requesting bus agents coupled to the bus 30 that are implemented without circuitry for performing deferred responses employ the defer enable signal to disable deferred responses. A communication transaction issued with the defer enable signal inactive may be completed in-order or retried, but not deferred.

A responding bus agent coupled to the bus 30 indicates a retry to a communication transaction during the response phase of the communication transaction. The retry condition is indicated by an active DEFER signal and an inactive HITM signal during the snoop phase of the communication transaction, followed by a retry indication during the response phase the communication transaction.

Requesting bus agents coupled to the bus 30 that are implemented with circuitry for performing deferred responses may enable deferred responses with the defer enable signal. A communication transaction issued with the defer enable signal active may be completed in order, retried, or deferred. A deferred communication transaction is indicated by an active DEFER signal and an inactive HITM signal during the snoop phase of the communication transaction, followed by a deferred response indication during the response phase of the communication transaction.

Each bus agent coupled to the bus 30 removes a communication transaction from the in-order queue if a deferred response or a retry response is indicated for the communication transaction. A requesting bus agent that receives a retry response repeatedly initiates the transaction until a deferred response is indicated or until in-order completion response is indicated.

A bus agent that indicates a deferred response during a communication transaction latches the deferred identifier issued during the request phase of the communication transaction. The bus agent that indicates the deferred response is referred to as the deferring bus agent. A deferring bus agent then completes one bus transaction with the latency as required. When the transaction is complete the deferring bus agent initiates a corresponding deferred reply transaction over the bus 30 to complete the original transaction. The deferring bus agent transfers the latched deferred identifier for the deferred transaction as the request address during the request phase of the deferred reply transaction.

The deferring bus agent generates the corresponding deferred reply transaction to transfer completion status for the deferred transaction. The deferring bus agent transfers the deferred identifier over the address lines of the bus 30 during the request phase of the deferred reply.

A deferred reply transaction on the bus 30 may not include a data phase. In such a case, the deferring bus agent asserts a no data response during the response phase of the deferred reply transaction to indicate no data. For example, the processor 20 issues invalidation transactions over the bus 30 during "read for ownership" of cache line operations. If an invalidation transaction receives a deferred response, the deferring bus agent thereafter initiates a deferred reply transaction and asserts a no data response during the response phase of the deferred reply transaction. The no data response indicates that the deferred reply transaction does not have a data phase.

A deferring bus agent asserts a data response (normal data or implicit writeback) during the response phase of a deferred reply transaction to indicate that the deferred reply transaction includes a data phase. The requesting bus agent that caused the deferred reply recognizes that data is being returned during the deferred reply transaction. The requesting bus agent that caused the deferred reply receives the data over the bus 30 and updates if necessary the internal cache and cache data state.

The cache data state for a deferred read line transaction on the bus 30 is indicated by a HIT signal (the active low HIT#, hereinafter HIT) after completion of the deferred reply for the read line transaction. A deferring bus agent that generates a deferred reply for a deferred memory invalidate transaction on the bus 30 that hits a modified cache line on the bus 60 asserts the HITM signal during the snoop phase of the deferred reply on the bus 30. The modify HIT signal on the bus 30 enables the return of the unexpected cache data from the bus cluster 12 during the deferred reply on the bus 30. In addition, the snoop phase on the bus 30 indicates changes in the length of returned data.

Bus agents employ the deferred response mechanism if an operation requested by a communication transaction has a substantial latency. The deferred response mechanism is employed by non-blocking bus bridge circuits on the bus 30 to guarantee forward progress in communication transactions over such a bus bridge.

Bus agents coupled to the bus 30 have special processor ordering and snoop responsibilities during a deferred communication transaction. The DEFER signal is an early indication to the requesting bus agent that the transaction may be deferred and that in-order completion of the transaction is not guaranteed. The early deferred response indication causes the requesting bus agent to stop issuing subsequent order dependent transactions until the deferred transaction is successfully completed.

An active HITM signal during the snoop phase overrides an active DEFER signal. The HITM signal indicates that a bus agent coupled to the bus 30 and having an internal data cache assumes responsibility for the in-order completion of the communication transaction with an implicit writeback.

If the HITM signal is inactive during the snoop phase of a communication transaction on the bus 30 deferred by the DEFER signal, then the addressed bus agent bus agent is responsible for generating a response to the deferred transaction. The addressed bus agent also assumes snoop responsibility for the cache line addressed by the deferred transaction. The addressed bus agent snoops the cache line of the deferred transaction during subsequent communication transactions on the bus 30 that are targeted to the same address. The requesting bus agent for the deferred transaction does not assume snoop responsibility for the cache line until the deferred transaction is completed by a deferred reply transaction on the bus 30.

If the HITM signal is inactive and the DEFER signal is asserted during the snoop phase of the communication transaction, the addressed bus agent either cancels the transaction with a retry response during the response phase or issues a deferred response during the response phase.

Each responding bus agent that supports the deferred response mechanism maintains an internal buffer for deferred reply transactions. A bus agent assigns an entry for each deferred transaction in the deferred reply buffer and stores the deferred identifier for the deferred transaction into the deferred reply buffer.

A bus agent that defers a transaction requests ownership of the bus 30 after performing the appropriate operation required to complete the transaction. The bus agent issues a deferred reply transaction over the bus 30 Using the deferred identifier as the address during the request phase of the deferred reply transaction. The bus agent also reclaims free entries in the internal deferred reply buffer.

Each requesting bus agent internally maintains an outstanding transaction queue for deferred identifiers. During a deferred reply transaction, the requesting bus agent compares the deferred reply address transferred during the request phase with all deferred identifiers stored in the outstanding transaction queue. If the deferred reply address causes a match to the outstanding transaction queue, then the requesting bus agent retires the corresponding deferred transaction from the outstanding transaction queue and completes the deferred operation.

Figure 3:
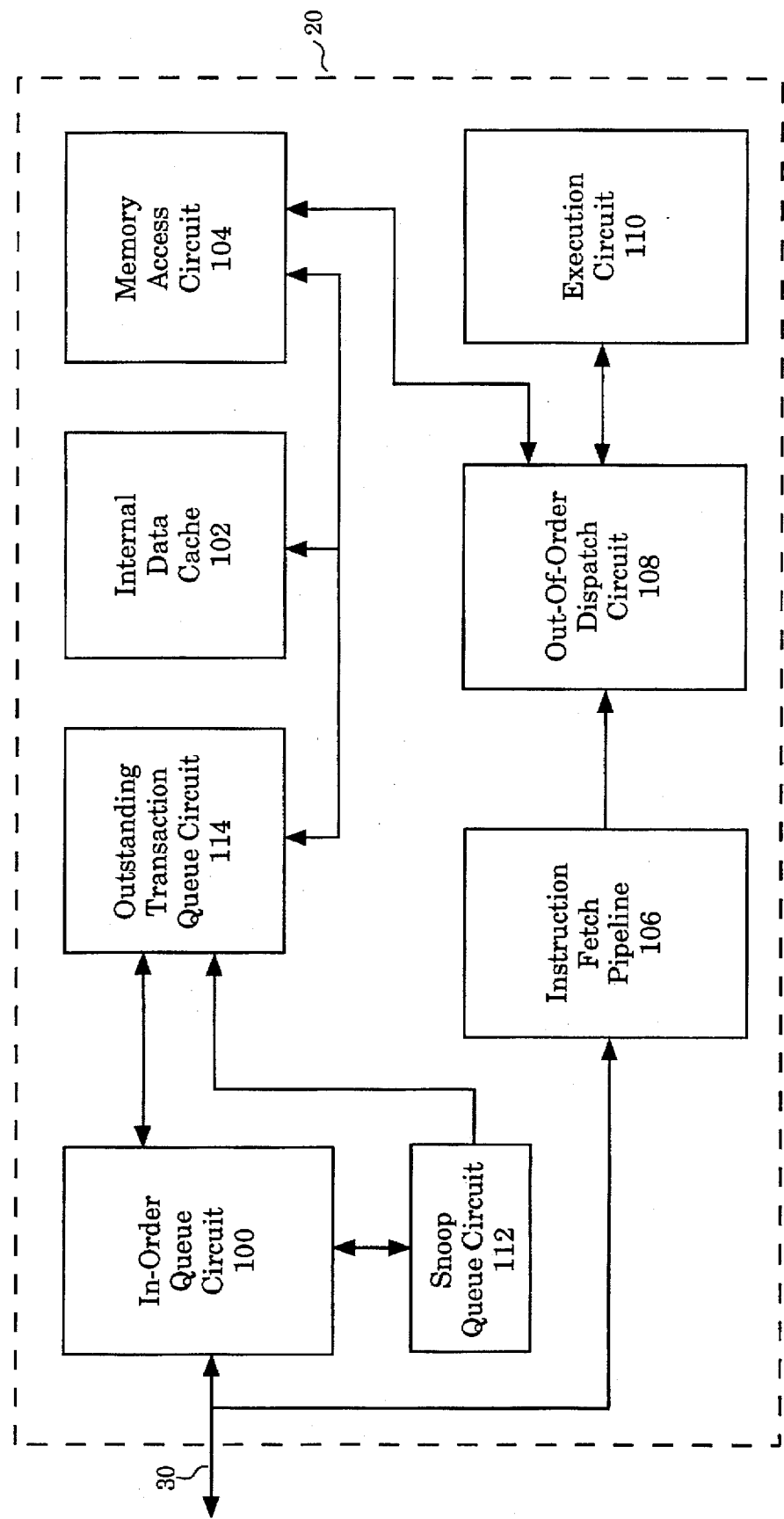
FIG. 3 illustrates a processor for one embodiment which comprises an internal data cache, a memory access circuit, and transaction queues for tracking deferred transactions.

FIG. 3 illustrates the processor 20 for one embodiment. The processor 20 comprises an internal data cache 102, a memory access circuit 104, an instruction fetch pipeline 106, an out-of-order dispatch circuit 108, and an execution circuit 110. The processor 20 further comprises an in-order queue circuit 100, a snoop queue circuit 112, and an outstanding transaction queue circuit 114.

The instruction fetch pipeline 106 fetches an instruction stream from the memory subsystem 26 according to a sequential program order. The instruction fetch pipeline 106 transfers the instruction stream to the out-of-order dispatch circuit 108. The out-of-order dispatch circuit 108 dispatches instructions of the instruction stream to the execution circuit 110 according to availability of source data for the instructions and execution resources in the execution circuit 110 rather than the sequential program order.

The out-of-order dispatch circuit 108 dispatches memory access instructions including load and store instructions to the memory access circuit 104. The memory access circuit 104 executes the memory access instructions by accessing the internal data cache 102. The memory access circuit 104 enters communication transactions in the outstanding transaction queue circuit 114. Each entry in the outstanding transaction queue circuit 114 corresponds to a communication transaction issued by the processor 20 over the bus 30. Each entry in the outstanding transaction queue circuit 114 indicates whether the corresponding communication transaction is deferred, and indicates the final cache state for the cache line according to completion of the communication transaction.

The in-order queue circuit 100 logs bus transaction information for the bus 30. Each entry in the in-order queue circuit 100 corresponds to a transaction on the bus 30. Each entry in the in-order queue circuit 100 includes the status of the DEFER and HITM signals for the corresponding transactions. The outstanding transaction queue circuit 114 obtains information to determine the final cache state for communication transactions from the in-order queue circuit 100.

The snoop queue circuit 112 reads the status of the DEFER and HITM signals from the in-order queue circuit 100. The snoop queue circuit 112 determines snoop ownership transfers for each entry of the in-order queue circuit 100. The snoop queue circuit 112 determines whether a transaction requires that the processor 20 pick up snoop ownership for a cache line, or postpone snoop ownership for the cache line, or regain snoop ownership during a deferred transaction.

The memory access circuit 104, and the outstanding transaction queue circuit 114 maintain the cache states for the cache lines in the internal cache 102. The cache states for the internal data cache 102 comprise a modified state, an exclusive state, a shared state, and an invalid state. A cache line in the invalid state is not a variable in the internal data cache 102.

A cache line in the modified state is stored in modified form in the internal data cache 102. A modified cache line in the internal data cache 102 is not current in the memory subsystem 26 or in a valid state in any of the internal data caches of the processors 21–23 or the input/output subsystem 25. Similarly, a modified cache line in the internal data cache 102 is not stored in the memory subsystem 55 or in any of the internal data caches of the processors 50–52 or the input/output subsystem 54.

A cache line in the exclusive state is stored in the internal data cache 102. The exclusive state cache line is also current in either the memory subsystem 26 or the memory subsystem 55.

A cache line in the shared state is stored in the internal data cache 102. The shared cache line may also be stored in an internal data cache one of any of the processors 21–23 or 50–52 and is current in either the memory subsystem 26 or the memory subsystem 55.

Figure 4:
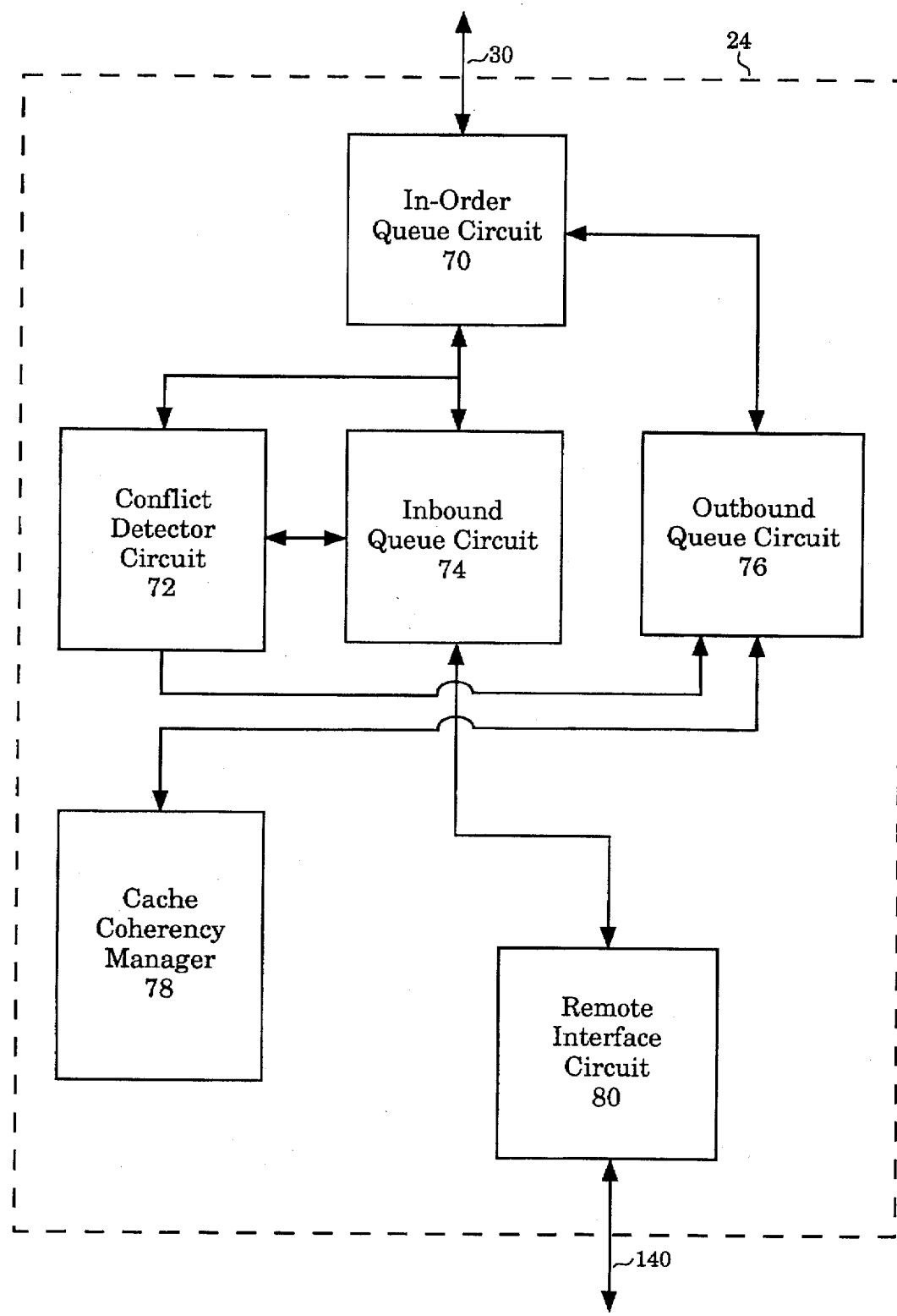
FIG. 4 illustrates a node interface circuit for one embodiment which comprises transaction queues for tracking deferred transactions and for propagating deferred transactions between bus clusters.

FIG. 4 illustrates the node interface circuit 24 for one embodiment. The node interface circuit 24 comprises an in-order queue circuit 70, an inbound queue circuit 74, and an outbound queue circuit 76. The node interface circuit 24 further comprises a conflict detector circuit 72, a cache coherency manager 78, an remote interface circuit 80.

The in-order queue circuit 70 logs communication transaction information for the bus 30. Each entry in the in-order queue circuit 70 corresponds to a transaction on the bus 30. The in-order queue circuit 70 transfers communication transactions that require access to the bus cluster 12 into the inbound queue circuit 74. The in-order queue circuit 70 creates deferred reply transaction entries in the outbound queue circuit 76 for communication transactions that require access to the bus cluster 12 and consequently a later deferred reply transaction.

The remote interface circuit 80 accesses communication transaction from the inbound queue circuit 74 and performs the required access to the bus cluster 12 over the system interconnect bus 140. The remote interface circuit 80 collects returning cache line data and snoop status from the bus cluster 12 and writes the cache line data and snoop status into the appropriate deferred reply transaction entries in the outbound queue circuit 76. The outbound queue circuit 76 issues the assembled deferred reply transactions over the bus 30. The remote interface circuit 80 removes completed remote transaction from the inbound queue circuit 74.

The conflict detector circuit 72 accesses the inbound queue circuit 74 and the in-order queue circuit 70. The conflict detector circuit 72 determines whether a transaction logged in the in-order queue circuit 70 is targeted for that same cache line a remote transaction logged in the inbound queue circuit 74. The conflict detector circuit 72 enters an invalidate line entry for a back invalidation transaction into the outbound queue circuit 76 if the conflicting remote access to a cache line is detected. The back invalidation transaction is later issued over the bus 30 to cause a retry of the conflicting access.

FIG. 5 illustrates a read transaction on the bus 30 that receives a deferred response, followed by a deferred reply transaction for the read transaction. The clock periods T21 through T36 of the bus 30 clock are shown. The processor 20 generates the read transaction as the requesting bus agent for the read transaction. The node interface circuit 24 defers the read transaction as the addressed bus agent for the read transaction.

During time T21, the processor 20 asserts the address strobe (ADS#) signal and asserts a request group {REQUEST} onto the bus 30 to indicate a read line request during the request phase of the read transaction. The snoop phase of the read transaction starts during time T25. During the snoop phase, the node interface circuit 24 determines that the read transaction cannot be completed in-order because the specified cache line for the read transaction must be accessed from the bus cluster 12. Accordingly, the node interface circuit 24 asserts the defer (DEFER#) signal on the bus 30. The HITM signal (HITM#) is inactive in during time T26.

During time T27, the node interface circuit 24 indicates a deferred response by asserting the appropriate encoding on the RS[2:0]# lines of the bus 30. The node interface circuit 24 creates a deferred reply transaction entry in the outbound queue circuit 76 and stores the deferred identifier for the read transaction into the newly created entry. The period between times T28 and T29 comprises one or more periods of the bus 30 CLK, wherein the remote interface circuit 80 of the node interface circuit 24 obtains the data required by the deferred read transaction from the bus cluster 12.

During time T29, the node interface circuit 24 generates a deferred reply transaction over the bus 30 with the deferred identifier for the read transaction as the address for the deferred reply transaction. During time T33, the node interface circuit 24 asserts the hit (HIT#) signal on the bus 30 to indicate the final cache state of the returned cache line should be shared according to the snoop status returned from the bus cluster 12.

Also during time T33, the snoop queue circuit of the processor 20 picks up snoop responsibility for the cache line specified by the deferred read transaction. During time T35, the processor 20 indicates a normal completion response and begins the data phase of the deferred reply transaction.

During time T30, the processor 20 senses the deferred reply transaction on the bus 30. The processor 20 matches the deferred identifier for the deferred reply transaction to one of the deferred identifiers stored in the internal outstanding transaction queue circuit 114.

During time T34, the processor 20 senses the final state of the returned cache line indicated by the hit or HITM signal on the bus 30 and updates the final cache state for the deferred read transaction in the outstanding transaction queue circuit 114. During time T36, the processor 20 senses the deferred reply transaction response phase and removes the deferred read transaction from the outstanding transaction queue circuit 114 and the in-order queue circuit 100.

The node interface circuit 24 assumes the snoop ownership of a read cache line within the bus 30 cluster after asserting DEFER signal during the snoop phase of a read transaction to that cache line. The node interface circuit 24 can indicate a retry response or a deferred response to a subsequent access within the bus 30 cluster to that cache line, as detected by the conflict detector circuit 72. The node interface circuit 24 thereafter issues the deferred reply transaction to the processor 20. The node interface circuit 24 back invalidates the cache line from the processor 20 internal cache before returning a deferred reply to the requesting bus agent for the subsequent transaction if required.

The node interface circuit 24 also initiates an invalidate line transaction if a request from a bus agent coupled to the bus 60 is received before completion of the deferred reply to the deferred read transaction. The node interface circuit 24 initiates the invalidate line transaction to order the inbound transaction from the bus 60 ahead of the outbound transaction from the bus 30. The node interface circuit 24 as a cluster manager employs such a mechanism to eliminate a race condition between conflicting accesses to a cache line from the bus clusters 10 and 12.

FIG. 6 illustrates a snoop ownership pickup by the memory subsystem 26 after indicating a deferred response to a first invalidate line request from the processor 20. The memory subsystem 26 is the addressed bus agent for the first invalidate line transaction from the processor 20. In the absence of the deferred response, snoop ownership for the addressed cache line would immediately transfer to the processor 20.

During time T41, the processor 20 as a requesting bus agent asserts the address strobe signal (ADS#) and transfers a request {REQUEST} group over the bus 30 to issue the first invalidate line request. During time T44, the processor 22 as a requesting bus agent asserts the address strobe signal and transfers a request group over the bus 30 to issue the second invalidate line request targeted for the same cache line as the first invalidate line request.

The memory subsystem 26 asserts the DEFER signal (DEFER#) during the snoop phase and indicates a deferred response during the response phase of the first invalidate line request to defer the response to the processor 20. The memory subsystem 26 also senses the second invalidate line request and determines that the requested address for the second invalidate line request specifies the cache line of the deferred first invalidate line request. The memory subsystem 26 asserts the DEFER signal during the snoop phase and indicates a retry response during the response phase of the second invalidate line request from the processor 22. All subsequent attempts by the processor 22 to reissue the second invalidate line request prompt a retry response by the memory subsystem 26.

During time T46, the processor 20 senses that the DEFER signal is active and determines that the first invalidate line request is not guaranteed in-order completion. The processor 20 does not accept ownership of the cache line of the first invalidate line request, and therefore does not assert the modified hit (HITM#) signal during time T48 which is the snoop phase of the second invalidate line request.

During time T49, the processor 22 senses the DEFER signal active and determines that the second invalidate line request is not guaranteed in-order completion. The processor 22 maintains an invalid cache state for the requested cache line.

The period between times T51 and T52 comprises one or more periods of the bus 30 clock, wherein the memory subsystem 26 obtains the cache line data required by the deferred first invalidate line transaction. During time T53, the memory subsystem 26 initiates a deferred reply transaction. During time T54, the processor 22 reissues the second invalidate line transaction. The processor 20 assumes snoop ownership of the returned cache line during time T57. Thereafter, the processor 20 senses the second invalidate line transaction and completes the transaction.

Figure 7A:
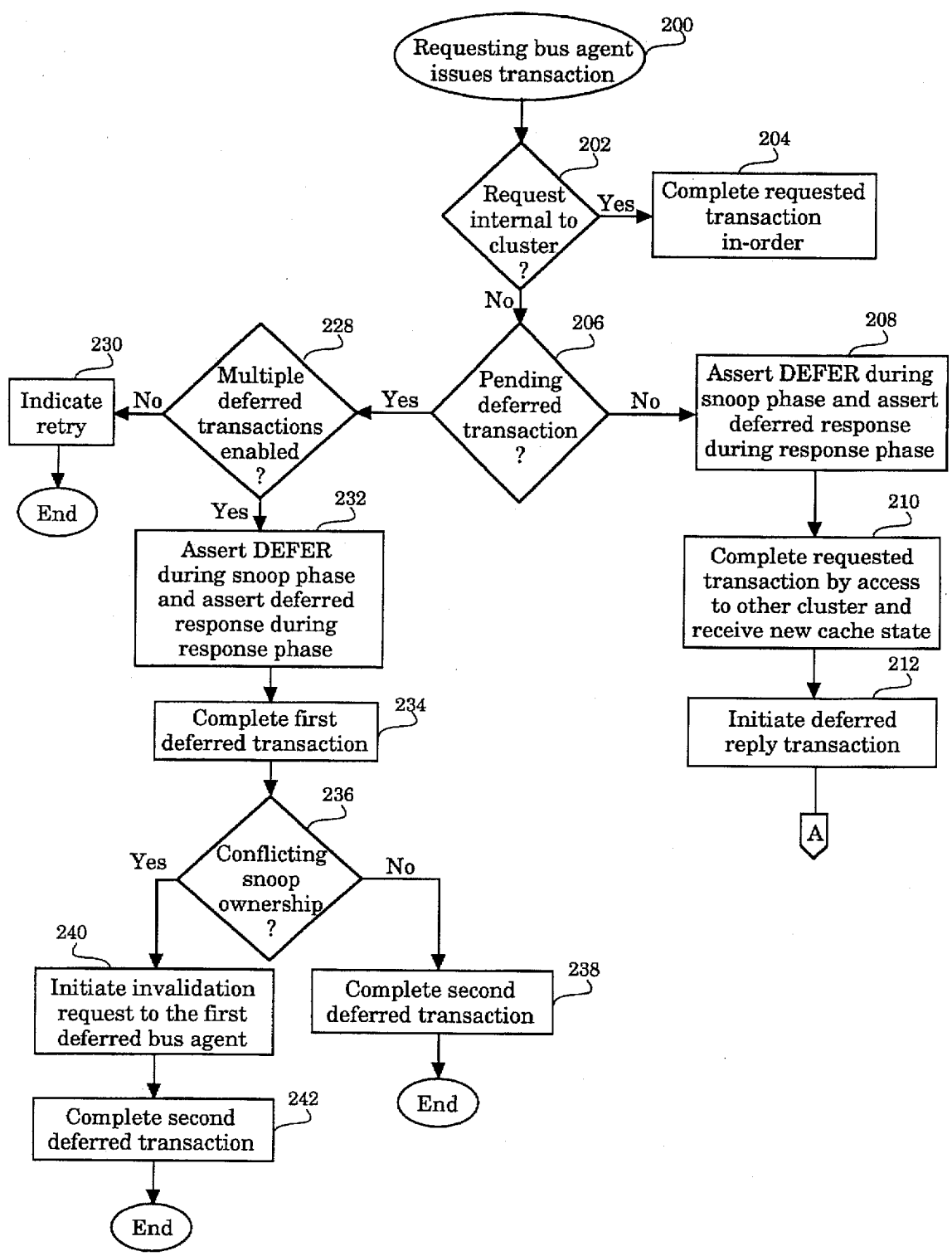
FIGS. 7A and 7B provide a flow chart that illustrates the handling of a communication transaction by the node interface circuit.
Figure 7B:
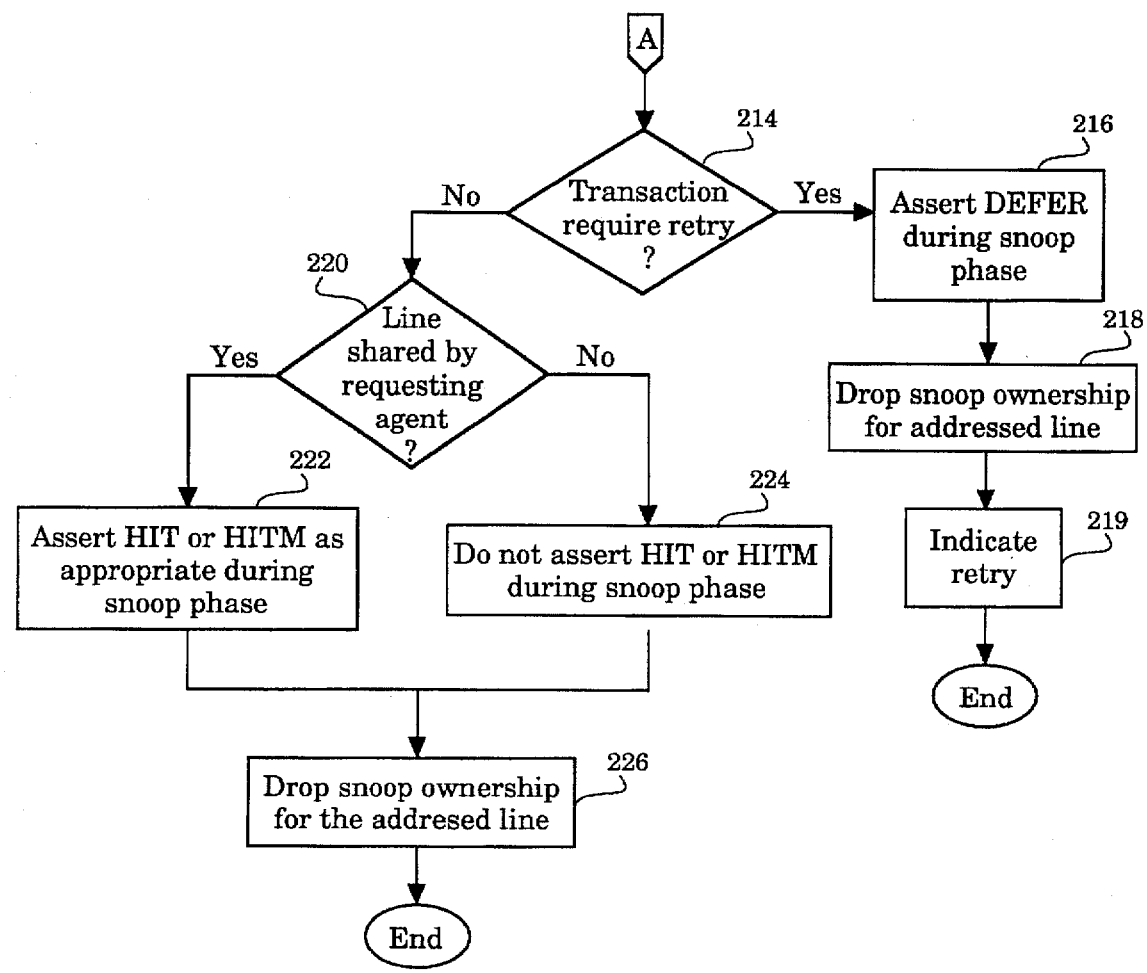

FIG. 7a–7b is a flow chart that illustrates the handling of a communication transaction by the node interface circuit 24. At block 200, a requesting bus agent initiates a communication transaction over the bus 30.

At decision block 202 the node interface circuit 24 determines whether the request specified by the communication transaction can be satisfied within the bus cluster 10. If the request can be completed within the bus cluster 10 then control proceeds to block 204. At block 204, the node interface circuit 24 completes the requested communication transaction in-order, i.e. by not deferring the communication transaction.

If the node interface circuit 24 determines that the request cannot be satisfied within the bus cluster 10 at decision block 202, then control passes to decision block 206. At decision block 206, the conflict detector circuit 72 determines whether a deferred transaction is pending that conflicts with the communication transaction. A pending deferred transaction conflicts with the communication transaction of the pending deferred transaction and the communication transaction target the same cache line data. If a pending deferred transaction does not conflict with the communication transaction then control proceeds to block 208.

At block 208, the node interface circuit 24 defers the communication transaction by asserting the DEFER signal during the snoop phase of the communication transaction and then asserting a deferred response during the response phase of the communication transaction. The not interface 24 also creates a deferred reply transaction entry in the outbound queue 76. Thereafter, at block 210 the remote interface circuit 80 completes the communication transaction by accessing the bus cluster 12. At block 210, the remote interface circuit 80 receives a new cache state for the cache line specified by the communication transaction from the bus cluster 12 and places the new cache state and cache line data if necessary into the corresponding deferred reply transaction entry in the outbound queue 76.

Thereafter, at block 212 the node interface circuit 24 initiates the corresponding deferred reply transaction from the outbound queue 76 onto the bus 30. At decision block 214, the node interface circuit 24 determines whether the communication transaction requires a retry. The transaction requires a retry if not successfully completed to the bus cluster 12. If the communication transaction requires retry at decision block 214, then control proceeds to block 216.

At block 216, the node interface circuit 24 asserts the DEFER signal during the snoop phase of the deferred reply transaction. Thereafter at block 218, the node interface circuit 24 drops snoop ownership for the cache line specified by the communication transaction, and at block 219 the node interface circuit 24 indicates a retry for the communication transaction. The snoop ownership is assumed by the original requesting bus agent for the communication transaction.

If the transaction does not require retry at decision block 214 then control proceeds to decision block 220. At decision block 220, the node interface circuit 24 determines whether the cache line specified by the communication transaction is shared with a bus agent coupled to the bus cluster 12. If the cache line is shared then control proceeds to block 222.

At block 222, the node interface circuit 24 asserts the HIT signal or the HITM signal during the snoop phase of the deferred reply transaction according to the snoop results for the communication transaction from the bus cluster 12. If the cache line is not shared at decision block 220 then control proceeds to block 224. At block 224 the node interface circuit 24 does not assert the HIT or the HITM signal during the snoop phase of the deferred reply transaction. In either case, at block 226 the node interface circuit 24 passes snoop ownership for the cache line of communication transaction to the requesting bus agent.

If a pending deferred transaction does conflict with the communication transaction at derision block 206 then control proceeds to decision block 228. At decision block 228, the node interface circuit 24 determines whether multiple deferred transactions are enabled. If multiple deferred transactions are not enabled then control proceeds to block 230. At block 230, the node interface circuit 24 indicates a retry for the communication transaction. The requesting bus agent later retries the communication transaction thereby allowing time to complete the pending deferred transaction.

If multiple deferred transactions are enabled at decision block 228 then control proceeds to block 232. At block 232, the node interface circuit 24 defers the communication transaction asserting the DEFER signal during the snoop phase and indicating a deferred response during the response phase of the communication transaction.

Thereafter, at block 234 the first pending deferred transaction is completed in accordance with the sequence of blocks 210–226.

Thereafter, at decision block 236 the cache coherency manager 78 determines whether a conflicting snoop ownership exists between the first deferred transaction completed at block 234 and the communication transaction deferred at block 232 (the second deferred transaction). A snoop ownership conflict exists if the first and second deferred transactions target the same cache line. If a conflicting snoop ownership does not exist at decision block 236 then control proceeds to block 238. At block 238, the node interface circuit 24 completes the communication transaction deferred at block 232 in accordance with blocks 210–226.

If a conflicting snoop ownership exists at decision block 236 then control proceeds to block 240. At block 240, the node interface circuit 24 initiates an invalidate line communication transaction on the bus 30 to the requesting bus agent for the conflicting deferred transaction completed at block 234. The invalidation request is a back invalidation for the first deferred transaction that invalidates the cache line having conflicting snoop ownership. Thereafter, at block 242 the node interface circuit 24 completes the communication transaction deferred at block 232 in accordance with blocks 210–226.

Figure 8:
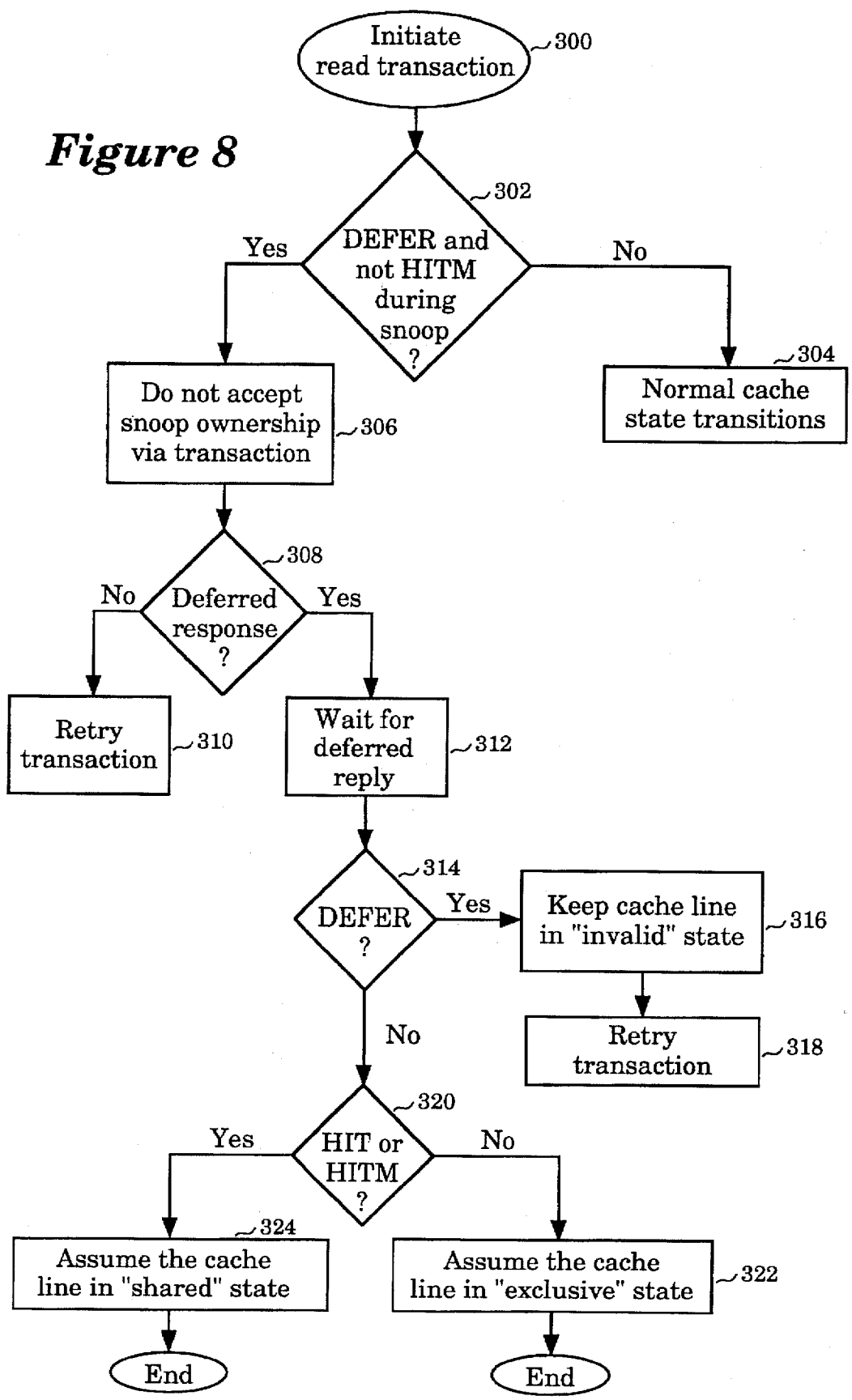
FIG. 8 is a flowchart illustrating a read transaction by a requesting bus agent.

FIG. 8 is a flowchart illustrating a read request by a requesting bus agent. At block 300, the requesting bus agent initiates a read transaction on the bus 30.

During the snoop phase of the read transaction at decision block 302, the requesting bus agent senses the state of the DEFER and the HITM signals on the bus 30. If the DEFER signal is asserted and the HITM signal is not asserted at decision block 302 then control proceeds to block 306. Otherwise control proceeds to block 304. At block 304, the requesting bus agent performs normal cache state transitions because the read transaction is completed in-order.

At block 306, the requesting bus agent does not assume snoop ownership for the cache line specified by the read transaction. At decision block 308, the requesting bus agent checks for a deferred response during the response phase of the read transaction. If a deferred response is not indicated at decision block 308 then control proceeds to block 310. At block 310 the requesting bus agent retries the read transaction if the addressed bus agent indicated retry during the response phase of the read transaction.

If a deferred response is indicated at decision block 308 then control proceeds to block 312. At block 312, the requesting bus agent waits for a deferred reply transaction on the bus 30. Thereafter, at decision block 314 the requesting bus agent senses the DEFER signal during the snoop phase of the deferred reply transaction. If the DEFER signal is asserted during the snoop phase of the deferred reply transaction then control proceeds to block 316. At block 316 the requesting bus agent maintains cache line of the read transaction in the invalid state. Thereafter, at block 318 the requesting bus agent retries the read transaction by reinitiating the read transaction over the bus 30.

If the DEFER signal is not asserted during the snoop phase of the deferred reply transaction at decision block 314 then control proceeds to decision block 320. At decision block 320, if the HIT signal or the HITM signal is asserted during the snoop phase during the snoop phase of the deferred reply transaction then control proceeds to block 324. At block 324, the requesting bus agent assumes ownership of the cache line specified in the read transaction in the shared cache state.

If the HIT or the HITM signal is not asserted during the snoop phase of the deferred reply transaction at decision block 320 then control proceeds to block 322. At block 322 the requesting agent assumes ownership of the cache line specified in the read transaction in the exclusive cache state.

Figure 9:
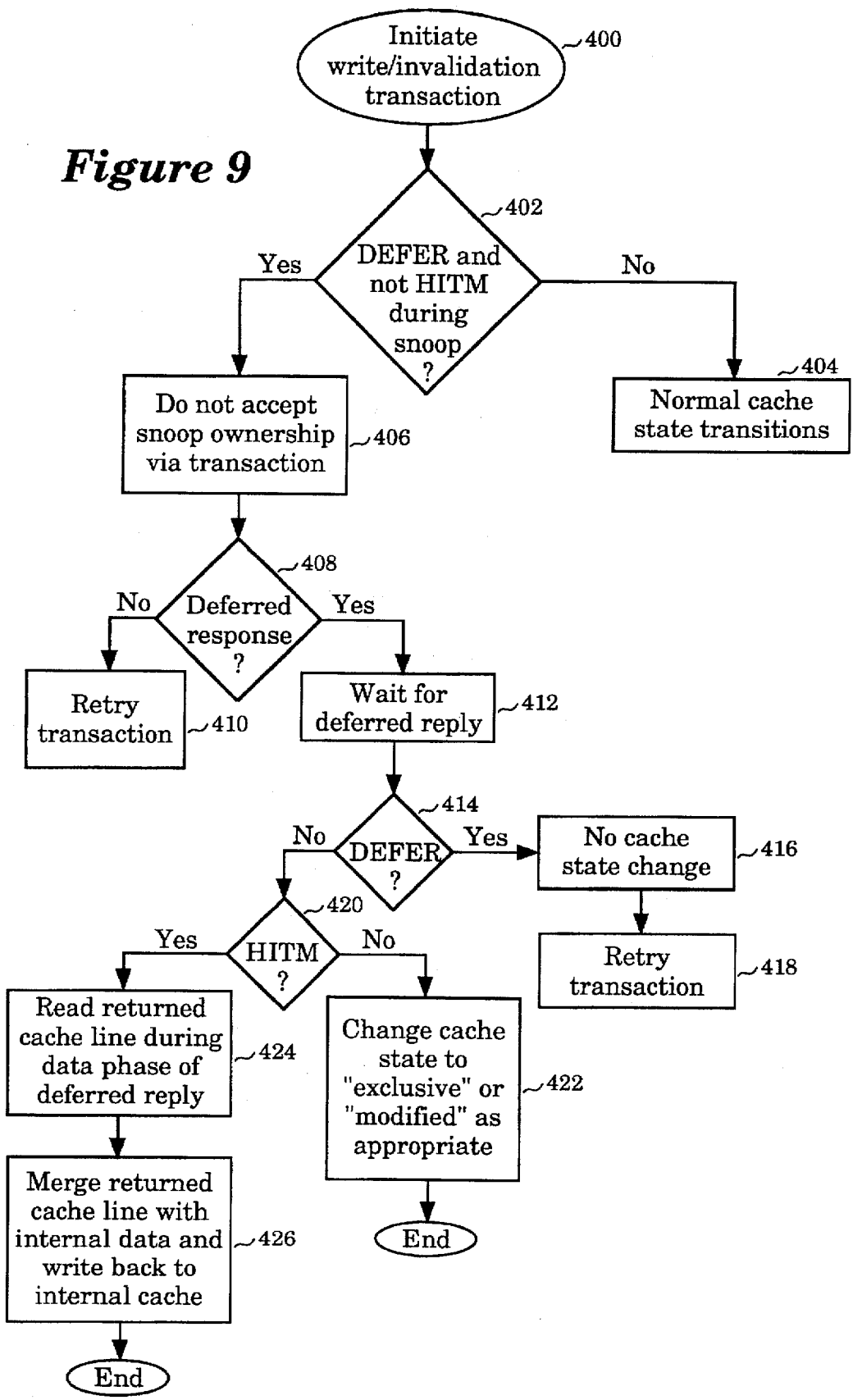
FIG. 9 is a flowchart illustrating a write transaction or an invalidation transaction by a requesting bus agent.

FIG. 9 is a flowchart illustrating a write transaction or an invalidation transaction by a requesting bus agent over the bus 30. At block 400, the requesting bus agent initiates the write or invalidation transaction over the bus 30.

During the snoop phase of the write or invalidation transaction at decision block 402, the requesting bus agent senses the state of the DEFER and the HITM signals on the bus 30. If the DEFER signal is asserted and the HITM signal is not asserted at decision block 402 then control proceeds to block 406. Otherwise control proceeds to block 404. At block 404, the requesting bus agent performs normal cache state transitions because the write or invalidation transaction is completed in-order.

At block 406, the requesting bus agent does not assume snoop ownership for the cache line specified by the write or invalidation transaction. At decision block 408, the requesting bus agent checks for a deferred response during the response phase of the write or invalidation transaction. If a deferred response is not indicated at decision block 408 then control proceeds to block 410. At block 410 the requesting bus agent retries the write or invalidation transaction if the addressed bus agent indicated retry during the response phase of the write or invalidation transaction.

If a deferred response is indicated at decision block 408 then control proceeds to block 412. At block 412, the requesting bus agent waits for a deferred reply transaction on the bus 30.

At decision block 414, if the DEFER signal is asserted during the snoop phase of the deferred reply transaction then control proceeds to block 416. At block 416, the requesting bus agent performs no cache state changes for the cache line specified by the write or invalidation transaction. Thereafter, at block 418 the requesting bus agent retries the write or invalidation transaction over the bus 30.

If the DEFER signal is not asserted during the snoop phase of the deferred reply transaction at decision block 414 then control proceeds to decision block 420. At decision block 420, the requesting bus agent determines whether the HITM signal is asserted during the snoop phase of the deferred reply transaction. If the HITM signal is not asserted at decision block 420 then control proceeds to block 422. At block 422 the requesting bus agent changes the cache state for the cache line of the write or invalidation transaction to the exclusive state or the modified state as indicated by the snoop results. If the HITM signal is asserted during the snoop phase at decision block 420 then control proceeds to block 424. At block 424 the requesting bus agent reads the returned cache line during the data phase of the deferred reply transaction. Thereafter, at block 426 the requesting bus agent merges the returned cache line with internal data and writes back the merged cache line into the internal cache of the requesting bus agent.

FIG. 10 summarizes the cache state transitions for a requesting bus agent on the bus 30 during a read transaction. The initial cache state and the final cache state for the internal cache of the requesting bus agent is shown for the read transaction and for the differing snoop result cases during the deferred reply transaction.

The requesting bus agent initiates the read transaction with the initial cache state and the invalid state. If the DEFER signal is asserted and the HITM signal is not asserted during the snoop response phase of the read transaction then the requesting bus agent maintains an internal invalid cache state for the cache line and the read transaction is deferred. Snoop ownership for the cache line by the requesting bus agent is also deferred.

If the DEFER signal is not asserted and the HIT signal is asserted during the snoop phase of the deferred reply transaction then the cache state in the requesting bus agent transitions to the shared cache state for the cache line of the read transaction. Also, if the DEFER signal is not asserted and the HITM signal is asserted during the snoop phase of the deferred reply transaction then the requesting bus agent transitions to the shared cache state.

If the DEFER signal is not asserted and the HIT signal is not asserted and the HITM signal is not asserted during the snoop phase of the deferred reply transaction then the requesting bus agent transitions to the exclusive cache state for the cache line of the read transaction. If the DEFER signal is asserted and the HITM signal is not asserted during the snoop phase of the deferred reply transaction then the requesting bus agent remains in the invalid cache state and the read transaction requires a retry.

FIG. 11 summarizes the cache state transitions for a requesting bus agent that issues an invalidate transaction over the bus 30 to invalidate a cache line. The initial and the final cache states for the internal cache of the requesting bus agent are shown for the invalidate transaction and for the differing snoop result cases during the deferred reply transaction and for a possible back invalidation transaction.

If the DEFER signal is asserted and the HITM signal is not asserted during the snoop response phase of the invalidate transaction then the requesting bus agent remains in the shared cache state for the cache line of the invalidate transaction and snoop ownership for the cache line is deferred.

The requesting bus agent transitions from the shared state to the modified state for the cache line of the invalidate transaction if the DEFER signal is not asserted and the HITM signal is not asserted during the snoop phase of the deferred reply transaction. The requesting bus agent remains in the shared cache state if the DEFER signal is asserted and the HITM signal is not asserted during the snoop response phase of the deferred reply transaction and the invalidate transaction requires a retry.

A back invalidation transaction may occur before the deferred reply transaction. The requesting bus agent transitions from the shared state to the invalid cache state for the cache line of the invalidate transaction if the DEFER signal is not asserted and the HITM signal is not asserted during the snoop response phase of the back invalidation transaction.

After the back invalidation transaction, the requesting bus agent transitions from the invalid cache state to the modified cache state if the DEFER signal is not asserted and the HITM signal is asserted during the snoop phase of the deferred reply transaction. The modified data is returned over the bus 30.

After the back invalidation transaction the requesting bus agent remains in the invalid cache state if the DEFER signal is asserted and the HITM signal is not asserted during the snoop phase of the deferred reply transaction. The requesting bus agent thereafter reinitiates the invalidate line transaction as a read for ownership transaction on the bus 30.

FIG. 12 summarizes the cache state transitions for a requesting bus agent issuing a read for ownership transaction over the bus 30. The initial cache state and the final cache state for the internal cache of the requesting bus agent is shown for the read for ownership transaction and for the differing snoop result cases during the deferred reply transaction.

The requesting bus agent remains in the invalid cache state if the DEFER signal is asserted and the HITM signal is not asserted during the snoop phase of the read for ownership transaction. Snoop ownership by the requesting bus agent of the cache line of the read for ownership transaction is deferred.

The requesting bus agent remains in the invalid cache state if the DEFER signal is asserted and the HITM signal is not asserted during the snoop phase of the deferred reply transaction. The requesting bus agent thereafter reinitiates the read for ownership transaction.

The requesting bus agent transitions from the invalid cache state to the modified cache state for the cache line of the read for ownership transaction if the DEFER signal is not asserted and the HIT signal is not asserted during the snoop phase of the deferred reply transaction. Similarly, the requesting bus agent transitions to the modified state if the DEFER signal is not asserted and the HITM signal is not asserted during the snoop phase of the deferred reply transaction. The requesting bus agent transitions from the invalid state to the modified state for the cache line of the read for ownership transaction if the HITM signal is asserted during the snoop phase of the deferred reply transaction.

FIG. 13 summarizes the internal cache state transitions for a requesting bus agent issuing a write through transaction over the bus 30. The initial and the final cache states for the internal cache of the requesting bus agent are shown for the write through transaction and for the differing snoop result cases during the deferred reply transaction and for a possible back invalidation transaction.

The requesting bus agent remains in the shared cache state and the write through transaction is deferred if the DEFER signal is asserted and the HITM signal is not asserted during the snoop phase of the write through transaction. Thereafter, a back invalidation transaction for the cache line causes the requesting bus agent to transition from the shared cache state to the invalid cache state regardless of the snoop results during the snoop phase of the back invalidation transaction.

The requesting bus agent remains in the shared cache state if the DEFER signal is asserted and the HITM signal is not asserted during the snoop phase of the deferred reply transaction and the write through transaction is thereafter retried. The requesting bus agent transitions from the shared cache state to the exclusive cache state if the DEFER signal is not asserted and the HIT signal is not asserted during the snoop phase of the deferred reply transaction.

The requesting bus agent transitions from the shared cache state or the invalid cache state to the exclusive cache state if the HITM signal is asserted during the snoop phase of the deferred reply transaction. The requesting bus agent obtains new cache line data from the deferred reply transaction.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system, comprising:

a requesting bus agent coupled to a bus, the requesting bus agent having circuitry for initiating a communication transaction on a bus;

an addressed bus agent coupled to the bus, the addressed bus agent having circuitry that senses the communication transaction on the bus, and transfers a defer indication over the bus indicating that a deferred reply transaction on the bus is required to complete the communication transaction; and a snooping bus agent coupled to the bus, the snooping bus agent having circuitry that senses the communication transaction on the bus, and overrides the defer indication and completes the communication transaction without the deferred reply transaction if the snooping bus agent is able to complete the communication transaction as determined by the snooping bus agent performing a snoop operation.

2. The computer system of claim 1, wherein the addressed bus agent transfers the defer indication over the bus if the communication transaction requires a bus latency greater than a predetermined bus latency.

3. The computer system of claim 1, wherein the requesting bus agent, the addressed bus agent, and the bus comprise a first bus cluster, and wherein the addressed bus agent is a bus cluster interconnect agent that enables communication between the first bus cluster and a second bus cluster of the computer system.

4. The computer system of claim 3, wherein the addressed bus agent transfers the defer indication over the bus if the communication transaction requires the addressed bus agent to access the second bus cluster.

5. The computer system of claim 4, wherein the addressed bus agent includes circuitry for initiating the deferred reply transaction on the bus to complete the communication transaction.

6. The computer system of claim 5, wherein the communication transaction specifies a cache line access and wherein the addressed bus agent transfers the defer indication over the bus by asserting a defer signal on the bus during a snoop phase of the communication transaction during which a snoop operation is performed on the bus.

7. The computer system of claim 6, wherein the addressed bus agent assumes snoop ownership for the cache line access after transferring the defer indication over the bus.

8. The computer system of claim 7, wherein the addressed bus agent includes circuitry for performing the cache line access to the second bus cluster and for receiving a set of snoop results from performing the snoop operation for the cache line access from the second bus cluster.

9. The computer system of claim 8, wherein the addressed bus agent initiates the deferred reply transaction on the bus and indicates the snoop results for the cache line access on the bus during a snoop phase of the deferred reply transaction.

10. The computer system of claim 9, wherein the addressed bud agent drops snoop ownership for the cache line access after completing the deferred reply transaction on the bus.

11. The computer system of claim 8, wherein the addressed bus agent senses a subsequent communication transaction on the bus that specifies a next cache line access while the deferred reply transaction for completion of the communication transaction is pending.

12. The computer system of claim 11, wherein the addressed bus agent includes circuitry for transferring a retry indication over the bus indicating that the subsequent communication transaction requires a later retry.

13. The computer system of claim 11, wherein the addressed bus agent performs the cache line access to the second bus cluster and receives the snoop results for the cache line access from the second bus cluster, then initiates the deferred reply transaction on the bus and indicates the snoop results for the cache line access on the bus during a snoop phase of the deferred reply transaction during which a snoop operation is performed on the bus, and then drops snoop ownership for the cache line access after completing the deferred reply transaction on the bus.

14. The computer system of claim 13, wherein the addressed bus agent includes circuitry for determining whether the cache line access and the next cache line access create a snoop ownership conflict.

15. The computer system of claim 14, wherein the addressed bus agent initiates an invalidation request over the bus to invalidate the snoop results for the cache line access if the snoop ownership conflict is detected.

16. The computer system of claim 1, wherein the snooping bus agent overrides the defer indication by asserting a hit signal on the bus during the snoop phase of the communication transaction.

17. The computer system of claim 1, wherein the requesting bus agent contains a cache memory and wherein the communication transaction comprises a cache access transaction targeted for a cache line.

18. The computer system of claim 17, wherein the defer indication causes the requesting bus agent to not accept snoop ownership for the cache line during the cache access transaction if a snooping bus agent coupled to the bus does not override the defer indication.

19. The computer system of claim 18 the requesting bus agent maintains the cache line in an invalid cache state if the addressed bus agent transfers the defer indication over the bus during the deferred reply transaction.

20. The computer system of claim 18, wherein the cache access transaction comprises a read transaction targeted for the cache line.

21. The computer system of claim 20 wherein the requesting bus agent assumes the cache line in a shared cache state if the addressed bus agent transfers a cache hit signal over the bus during a snoop phase of the deferred reply transaction during which a snoop operation is performed on the bus.

22. The computer system of claim 20 wherein the requesting bus agent assumes the cache line in an exclusive cache state if the addressed bus agent does not transfer a cache hit signal over the bus during a snoop phase of the deferred reply transaction.

23. The computer system of claim 18, wherein the cache access transaction comprises a write or invalidate line transaction targeted for the cache line.

24. The computer system of claim 23, wherein the requesting bus agent reads the cache line during a data phase of the deferred reply transaction if the addressed bus agent transfers a cache hit signal over the bus during a snoop phase of the deferred reply transaction during which a snoop operation is performed on the bus.

25. The computer system of claim 23 wherein the requesting bus agent assumes the cache line in an exclusive or modified cache state if the addressed bus agent does not transfer a cache hit signal over the bus during a snoop phase of the deferred reply transaction during which a snoop operation is performed on the bus.

26. A communication method in a computer system, comprising the steps of:
  initiating a communication transaction over a bus, the communication transaction specifying a cache line;
  an addressed bus agent sensing the communication transaction on the bus, and transferring a defer indication over the bus to indicate that completion of the communication transaction is deferred; and
  a snooping agent sensing the communication transaction on the bus, overriding the defer indication, and completing the communication transaction without a deferred reply transaction if the snooping bus agent is able to complete the communication transaction as determined by the snooping bus agent performing a snoop operation.

27. The communication method of claim 26, wherein the defer indication is transferred over the bus if the communication transaction requires a bus latency greater than a predetermined bus latency.

28. The communication method of claim 26, further comprising the step of initiating a deferred reply transaction over the bus to complete the communication transaction.

29. The communication method of claim 26, further comprising the steps of initiating a deferred reply transaction on the bus and indicating a result generated by performing a snoop operation for the cache line on the bus during the deferred reply transaction.

30. The communication method of claim 26, further comprising the steps of sensing a subsequent communication transaction on the bus that specifies a next cache line while a deferred reply transaction for completion of the communication transaction is pending.

31. The communication method of claim 30, further comprising the steps of transferring a retry indication over the bus to indicate that the subsequent communication transaction requires a later retry.

32. A computer system, comprising:
  a requesting bus agent coupled to a bus, the requesting bus agent comprising a first in-order transaction queue and circuitry for initiating a communication transaction on a bus and for logging the communication transaction into the first in-order transaction queue;
  an addressed bus agent coupled to the bus, the addressed bus agent having a second in-order transaction queue, and circuitry for sensing the communication transaction on the bus and for logging the communication transaction into the second in-order transaction queue, the addressed bus agent having circuitry for transferring a defer indication over the bus if the communication transaction requires a bus latency greater than a predetermined bus latency; and
  a snooping bus agent coupled to the bus, the snooping bus agent having circuitry that senses the communication transaction on the bus, and overrides the defer indication and completes the communication transaction without the deferred reply transaction if the snooping bus agent is able to complete the communication transaction as determined by the snooping bus agent performing a snoop operation.

33. The computer system of claim 32, wherein the addressed bus agent includes circuitry for initiating a deferred reply transaction on the bus to complete the communication transaction.

34. The computer system of claim 33, wherein the addressed bus agent initiates the deferred reply transaction on the bus to complete the communication transaction and removes the communication transaction from the second in-order transaction queue.

35. The computer system of claim 34, wherein the requesting bus agent senses the deferred reply transaction on the bus and then removes the communication transaction from the first in-order transaction queue.

36. The computer system of claim 32, wherein the requesting bus agent contains a cache, and wherein the communication transaction specifies a cache line access.

37. The computer system of claim 36, wherein the addressed bus agent contains bridge circuitry for propagating the cache line access to a remote bus cluster.

38. The computer system of claim 37, wherein the addressed bus agent transfers the defer indication over the bus if the cache line access requires that the addressed bus agent access the remote bus cluster.

* * * * *

UNITED STATES PATENT AND TRADEMARK OFFICE
CERTIFICATE OF CORRECTION

PATENT NO.   :   5,682,516
DATED        :   October 28, 1997
INVENTOR(S)  :   Sarangdhar et al.

It is certified that error appears in the above-identified patent and that said Letters Patent is hereby corrected as shown below:

In column 13 at line 57 delete "derision" and insert --decision--

Signed and Sealed this

Seventeenth Day of March, 1998

Attest:

BRUCE LEHMAN

Attesting Officer

Commissioner of Patents and Trademarks